United States Patent Office 3,262,165
Patented July 26, 1966

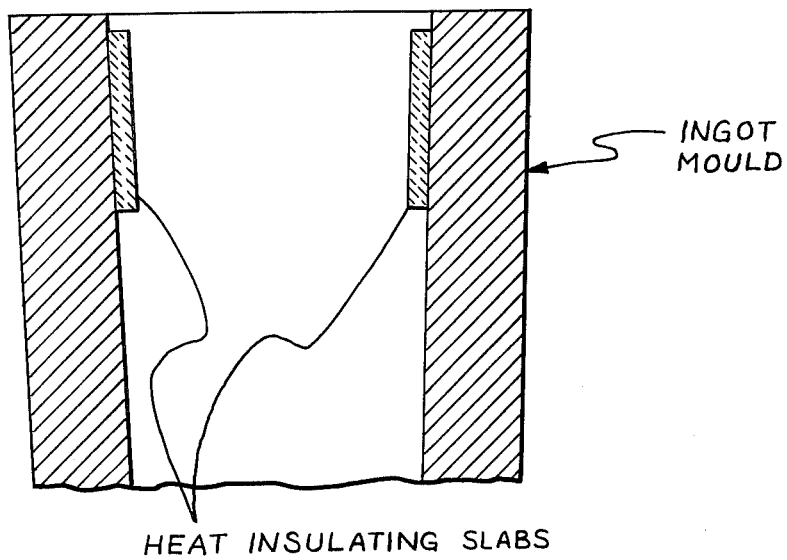

3,262,165
HEAT-INSULATING COMPOSITIONS AND THEIR USE
Anthony John Ingham, Birmingham, England, assignor, by mesne assignments, to Sandvikens Jernverks A.B., Sandviken, Sweden, a Swedish company
Filed Dec. 9, 1963, Ser. No. 329,316
Claims priority, application Great Britain, Dec. 17, 1962, 47,553/62
5 Claims. (Cl. 22—193)

This invention relates to heat-insulating compositions and to their use, for example in the production of ingots and castings wherein molten metal is poured into a mould and allowed to cool therein.

When molten metal cools during the forming of castings or ingots, it contracts and unless allowance is made for this shrinkage, either by means of a reservoir of molten metal above and in contact with the cooling mass of metal, or by repeated topping up of the solidifying mass, the final cooled shape will have fissures and cavities therein.

To provide the necessary molten metal above the casting, as continual topping up is very time consuming, many methods are used. One method is to provide a large head of metal, in some cases containing more metal than the casting, which owing to its latent heat and large mass remains liquid whilst the casting solidifies, and so provides the necessary feed metal. This is extremely uneconomical and in recent years various ways of economising in the amount of head metal necessary have been developed.

In one method the head metal is surrounded by a heat insulating body preferably itself of low heat capacity. Thus the head metal may be surrounded with fireclay or a refractory. In another method, which may be used in association with the method just referred to, there may be located in strategic positions relative to the head metal, compositions of which the ingredients, at the temperature of the molten metal, will react with one another exothermically. Carbonceous materials such as bonded coke, with or without wood chippings or like vegetable matter may be employed.

In the field of using exothermically reacting compositions, the compositions most commonly in use include a reducing agent such as aluminum powder, grindings or the like, oxidising agents such as nitrates, chlorates, iron oxide and manganese oxide and a proportion of fluoride to sensitise the exothermic reaction. Such compositions, while of the greatest general value, are not necessarily the best for all purposes. Thus owing to their relatively high cost they are not suitable for use in cases where small castings of low intrinsic value are being made. Also on large steel castings, where solidification takes place only slowly, they are not generally suitable owing to their sensitivity, which is such that they ignite soon after pouring the metal and generate heat which at an early stage of the solidification does not serve any real purpose. Also, on light alloy castings, such exothermic materials can in some cases cause grain coarsening in the casting directly beneath the exothermic material; this again is an undesirable feature which is usually overcome by including a refractory ring at the base of the exothermic material.

For these reasons there is demand for efficient insulating materials, having a low initial cost and preferably a low density and it is an object of this invention to provide compositions whereby these desiderata can be achieved.

According to the present invention there is provided a composition suitable as heat insulating material for the head metal in the production of castings and ingots which comprises essentially a granular heat-insulating refractory material, cork, or other organic material of similar physical characteristics, in granulated or powdered form, and a binder material. Preferably the compositions further contain a proportion of inorganic fibrous refractory material.

Generally the compositions will be preformed to shapes suitable to constitute a surround for the head metal, e.g. they may be preformed as sleeves surrounding heads of circular cross-section or as slabs fitting around heads of rectangular cross-section.

A preferred group of compositions are those in which the specified ingredients are present in the proportions:

|  | Parts by weight |
|---|---|
| Granular refractory material | 50 to 94 |
| Inorganic fibrous refractory material | 0 to 15 |
| Granulated or powdered cork | 5 to 35 |
| Binder | 1 to 20 |

Within this class, those compositions which contain the specified ingredients in the following proportions are preferred:

|  | Parts by weight |
|---|---|
| Granulated refractory material | 70–90 |
| Inorganic fibrous refractory material | 0.1–5 |
| Granulated or powdered cork | 5–20 |
| Binder | 4–10 |

Suitable granular refractory materials are granulated grog, fly ash, crushed slag, alumina, silica, titania, furnace aggregate and other refractory materials commonly used in the foundry industry. It is advantageous from the standpoint of securing strength in the lining to include an inorganic fibrous refractory such as one composed of or containing asbestos, rock wool, slag wool or fibre glass. Conveniently such fibrous material may have a fibre length of ¼ to ¾ inch.

Suitable binders are, for example, clays, silicates and synthetic resins, e.g. of the urea-formaldehyde type.

In some cases, when using this type of composition, especially with the high melting point non-ferrous metals, there is a tendency for the metal to penetrate the insulating layer; this can be overcome by providing a lining of refractory cement or the like on the inner face of the shape, the material being applied in a layer sufficiently thick to prevent metal penetration but not thick enough to abstract undue quantities of heat.

A further use of the compositions is as an insulating backing for exothermic materials either of the reducing agent/oxidising type or the carbonaceous type, and when using it as a backing to the former materials a separating layer of inert materials may sometimes be usefully introduced.

The compositions thus have a wide range of uses in connection with the feeding of molten metal to casting or ingot moulds. They are of low density and low heat capacity, they can be used in circumstances where a prestoving operation is necessary since they are not adversely affected by stowing and, used as a direct heat-insulating layer with molten light alloys, they remain a good insulating medium even when in contact with the molten metal since at the working temperatures for light alloys they are usually only partially charred or burnt.

The following example will serve to illustrate the invention:

*Example*

The following composition is prepared:

|  | Parts by weight |
|---|---|
| Silica sand | 83 |
| Fibre glass | 1 |
| Granulated cork | 9 |
| Binder | 7 |

The binder may be, conveniently, a mixture of a urea-formaldehyde resin and polyvinyl acetate or a mixture of a urea-formaldehyde resin and a phenol-formaldehyde resin.

The composition is shaped to form a sleeve lining to the riser of a mould used for casting iron. Good quality cast iron, substantially free from cavities and like defects was obtained and, after casting, the sleeve was readily stripped from the riser.

Whilst this invention has been described with reference to the use of cork as an ingredient of the composition, it is to be understood that any other material which has similar physical characteristics to those of cork can be employed in place of the cork in equal quantity. Suitable alternative materials are those synthetic plastic materials which have the resilience and lightness of weight of cork, e.g. foamed synthetic plastics such as foamed polystyrene or foamed polyurethane resins.

I claim as my invention:

1. A method for the production of castings and ingots wherein molten metal is passed into a mould wherein the head of the mould is provided with slabs of heat-insulating composition being a composition consisting essentially of 50 to 94 parts by weight of a granular heat-insulating refractory material, 5 to 35 parts by weight of cork in particulate form, 0 to 15 parts by weight of inorganic fibrous refractory material and 1 to 20 parts by weight of a binder material.

2. A method according to claim 1 wherein the refractory material is selected from the class consisting of grog, fly ash, crushed slag, aluminia, silica, titania and furnace aggregate.

3. A method according to claim 1 wherein the inorganic fibrous refractory material is present in a proportion of 0.1 to 5 parts by weight and is selected from the class consisting of asbestos, rock wool, slag wool and fibre glass.

4. A method according to claim 1 wherein the binder material is a resin.

5. A method according to claim 1 wherein the ingredients are present in the proportions of 70 to 90 parts by weight of the said granular heat-insulating refractory material, 5 to 20 parts by weight of cork in particulate form, 0.1 to 5 parts of inorganic fibrous refractory material and 4 to 10 parts by weight of binder material.

References Cited by the Examiner

UNITED STATES PATENTS

| | | | |
|---|---|---|---|
| 2,324,786 | 7/1943 | Lindemuth | 249—106 |
| 2,390,500 | 12/1945 | Charman et al. | 22—193 |
| 2,863,192 | 12/1958 | Kauffman | 249—106 |
| 3,006,046 | 10/1961 | Shephard et al. | 249—106 |
| 3,072,981 | 1/1963 | Davidson | 249—197 |

FOREIGN PATENTS

| | | |
|---|---|---|
| 563,752 | 9/1958 | Canada. |
| 903,502 | 8/1962 | Great Britain. |

J. SPENCER OVERHOLSER, *Primary Examiner.*

MARCUS U. LYONS, *Examiner.*